(12) United States Patent
Chowdhary et al.

(10) Patent No.: US 8,468,269 B2
(45) Date of Patent: Jun. 18, 2013

(54) METHOD AND SYSTEM FOR COMPRESSING LOCATION DATA OF A RADIO FOR OVER-THE-AIR TRANSMISSION

(75) Inventors: Dipendra M. Chowdhary, Hoffman Estates, IL (US); Thomas B. Bohn, McHenry, IL (US); Tianfang Liu, Naperville, IL (US); David G. Wiatrowski, Woodstock, IL (US)

(73) Assignee: Motorola Solutions, Inc., Schaumburg (IL)

( * ) Notice: Subject to any disclaimer, the term of this patent is extended or adjusted under 35 U.S.C. 154(b) by 115 days.

(21) Appl. No.: 13/195,611

(22) Filed: Aug. 1, 2011

(65) Prior Publication Data

US 2013/0036238 A1 Feb. 7, 2013

(51) Int. Cl.
*G01S 5/14* (2006.01)

(52) U.S. Cl.
USPC .............................. 709/247; 709/242; 342/46

(58) Field of Classification Search
USPC ..................................... 709/247, 232; 342/46
See application file for complete search history.

(56) References Cited

U.S. PATENT DOCUMENTS

| 6,043,777 A * | 3/2000 | Bergman et al. ......... 342/357.55 |
| 7,400,892 B1 | 7/2008 | Banks et al. |
| 2004/0266341 A1* | 12/2004 | Teunon ......................... 455/12.1 |
| 2009/0122780 A1 | 5/2009 | Valdivia et al. |
| 2011/0309965 A1* | 12/2011 | Colle et al. ...................... 342/45 |

FOREIGN PATENT DOCUMENTS

| FR | 2938960 A1 | | 5/2010 |
| WO | 0028347 A1 | | 5/2000 |
| WO | WO 00/28347 | * | 5/2000 |
| WO | 02097762 A1 | | 12/2002 |

OTHER PUBLICATIONS

International Search Report and Written Opinion for International Patent Application No. PCT/US2012/047841 issued on Oct. 1, 2012.

* cited by examiner

*Primary Examiner* — Jason Gee
(74) *Attorney, Agent, or Firm* — Daniel R. Bestor

(57) ABSTRACT

Disclosed are methods and systems for compressing location data of a radio for over-the-air transmission. A method includes obtaining raw latitude and raw longitude coordinates reflecting a current location of the client device, the raw latitude coordinate represented by x number of bits and the raw longitude coordinate represented by y number of bits. The raw latitude coordinate is truncated by removing n number of most significant bits from the raw latitude coordinate to create a compressed latitude coordinate. The raw longitude coordinate is truncated by removing m number of most significant bits from the raw longitude coordinate to create a compressed longitude coordinate, where m varies as a function of the value of the raw latitude coordinate. The compressed longitude and compressed latitude coordinates are then transmitted to another network device for decompression and use as an indication of the client device's absolute location.

22 Claims, 7 Drawing Sheets

METHOD AND SYSTEM FOR COMPRESSING LOCATION DATA OF A RADIO FOR OVER-THE-AIR TRANSMISSION

FIELD OF THE DISCLOSURE

The present disclosure relates generally to communication systems and more particularly to a method for compressing location data, such as GPS data, for transmission over the air to another network communications device, where it can be decompressed.

BACKGROUND

Mobile cell telephones, two-way radios, and other wireless client devices (WCDs) are experiencing tremendous growth in the U.S. and around the globe, giving users the ability to place a call, including an emergency call, from almost anywhere at any time. One important feature that is being included in most modern WCDs is an ability to determine and report a current location of the WCD.

Various methods to locate a WCD, at least approximately, may be used. One known approach to determine the location of a WCD is ground-based triangulation. In a ground-based triangulation system, the WCD's location is identified through a ranging technique between a plurality of base stations and a transponder at the WCD.

Another known technique is based on a determined time difference of arrival (TDOA) in which a data burst is received simultaneously at three base station sites. From the time difference of arrival of the data burst from the WCD at each of the base station sites, the approximate location of the WCD can be determined.

In a third known technique, a Global Positioning System (GPS) of satellites and a corresponding receiver in the WCD may be used. GPS is made up of more than two dozen earth-orbiting GPS satellites. Each satellite contains a computer, an atomic clock, and a radio. Each satellite continually broadcasts its changing position and time. These precise timing and position signals broadcast in radio frequency, allow the GPS receiver in the WCD to accurately determine a location of the GPS receiver (longitude, latitude, and/or altitude) anywhere on Earth that has a direct or indirect view of the orbiting satellites. The GPS satellites are positioned in orbit in a manner such that from any given point on Earth, at least four GPS satellites are visible above the horizon at any one time. The GPS receiver in the WCD also contains its own receiver and a computer that calculates its position using a process called trilateration, which is similar to triangulation. The GPS receiver calculates time signals from at least three GPS satellites to measure its distance from each satellite and to calculate a result. The calculation result is provided in the form of a geographic position (longitude and latitude). The location accuracy may be anywhere from 1 to 100 meters depending on the type of equipment used and the number of satellites visible. The GPS is owned and operated by the U.S. Department of Defense, but is available for general use around the world. The European Space Agency and the European Union are also building out a separate global navigation satellite system called Galileo, among other additional projects being pursued by other countries.

In one example, the GPS data payload, used to provide other devices with the determined position of the WCD, may use a 32-bit long absolute latitude coordinate and a 32-bit long absolute longitude coordinate. Given the frequency of location updates, and the number of WCDs transmitting location updates, the transfer of 64-bits of location data, in addition to overhead required to transfer the 64-bits of raw location data, generates significant traffic over a wireless network. For example, using the Motorola Solutions™ MOTOTRBO Location Request and Response Protocol (LRRP), in which LRRP control and data messages are sent via a wireless radio network within UDP/IP packets that are transported over the common air interface (CAI), 6-7 LRRP transmission bursts may be required to transfer the 64-bits of raw location data, including overhead, taking up more than 300 ms of transmit time per update.

Clearly, as more and more devices implement GPS receivers and location reporting, and as the frequency of location updates increases, GPS payload data is becoming a predominant bandwidth consumer over wireless area networks.

What is needed is a method and system for more efficiently transmitting GPS payload data, so that useful location-based services can continue to be provided and locations of WCD's provided to those agencies that rely on them, while decreasing the costs and network utilization rates inherent in providing such services.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
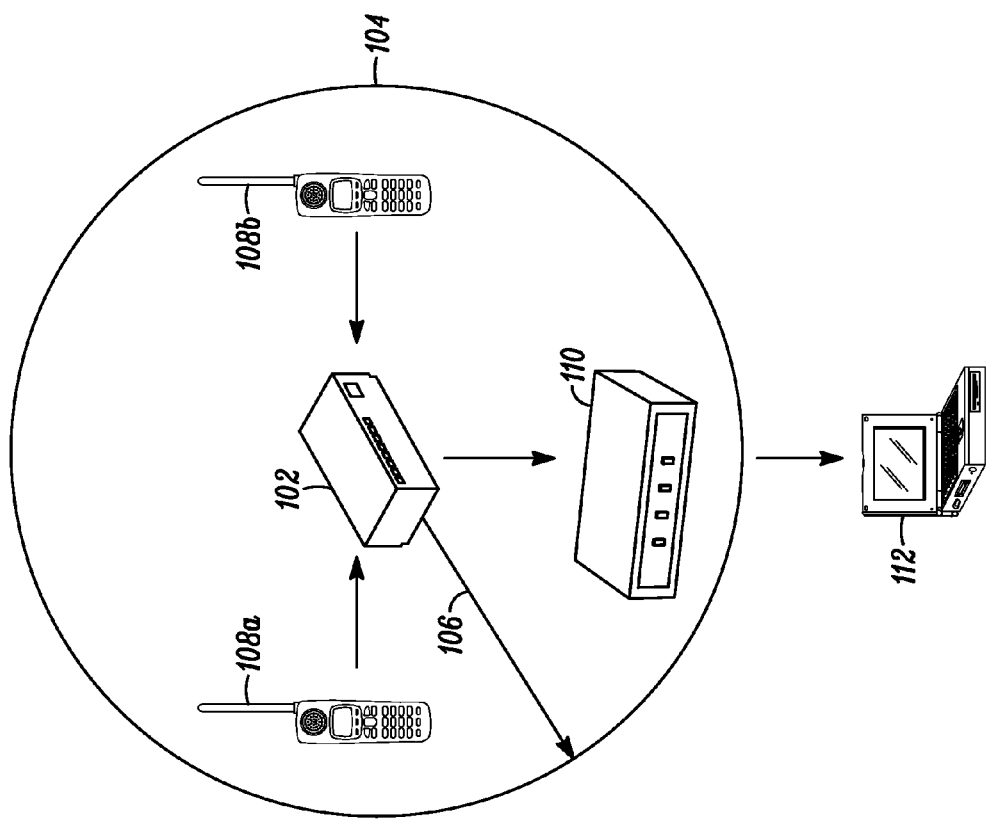
FIG. 1 is a block diagram of a communication system employing a method and system for compressing and decompressing location data of a radio for over-the-air transmission.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method and system for compressing location data of a radio for over-the-air transmission is provided herein. In operation, a client device obtains raw latitude and raw longitude coordinates reflecting a current location of the client device, the raw latitude coordinate represented by x number of bits and the raw longitude coordinate represented by y number of bits. The client device truncates the raw latitude coordinate by removing n number of most significant bits from the raw latitude coordinate to create a compressed latitude coordinate, and truncates the raw longitude coordinate by removing m number of most significant bits from the raw longitude coordinate to create a compressed longitude coordinate, where m varies as a function of the value of the raw latitude coordinate. The client device then wirelessly transmits the compressed longitude and compressed latitude coordinates to a network device for decompression and use as an indication of the client device's absolute location.

At the network device, the compressed longitude and compressed latitude coordinates are received from the client device, and the network device obtains raw latitude and raw longitude coordinates reflecting one of its current location and a current location of a wireless communications device in direct communication with the client device. The network device then decompresses the received compressed longitude and latitude coordinates using the received compressed longitude and latitude coordinates and its own determined raw latitude and longitude coordinates.

The compressed latitude coordinates are decompressed by comparing the compressed latitude coordinates with a sub-range of the raw latitude coordinates of the network device and, if it is determined that the difference is outside of a maximum wireless range of one of a wireless communications device and the network device, modifying remaining most significant bits of the raw latitude coordinate as a function of the difference. Then, the remaining most significant bits of the raw latitude coordinate, modified or unmodified, are concatenated to the compressed latitude coordinate to create a decompressed latitude coordinate.

The compressed longitude coordinates are decompressed by comparing the compressed longitude coordinate with a sub-range of bits in the raw longitude coordinates of the communication device, where the sub-range of bits varies as a function of the value of one the latitude coordinate (of the client device or the remote device, and, if it is determined that the difference is outside of a maximum wireless range of the wireless communications device, modifying remaining most significant bits of the raw longitude coordinate as a function of the difference. Then, the remaining most significant bits of the raw longitude coordinate, modified or unmodified, are concatenated to the compressed longitude coordinate to create a decompressed longitude coordinate.

Subsequently, the network device provides a determined absolute location of the client device using the decompressed latitude and longitude coordinates (to itself, or some other device in the communications network in which it is disposed or coupled).

Various other embodiments and variances will also be discussed, in more detail, in the following detailed description and attached figures.

I. Communication System Structure and Devices

FIG. 1 is a block diagram illustrating a communication system 100 employing a method and system for compressing location data of a radio for over-the-air transmission. The communication system 100 comprises a plurality of network devices (including a wireless communications device 102 having a coverage area 104 defined by a communications range 106, a switch/router/gateway (hereinafter, "switch") device 110, and a location-based services device 112), and one or more client devices 108.

The network devices, including the wireless communications device 102, switch device 110, and location-based services device 112, may be linked via one or more of private networks, public networks, such as the Internet, wireless networks, such as satellite and cellular networks, local area networks (LANs), wide area networks (WANs), wireless local area networks (WLANs), telephone networks, such as the Public Switched Telephone Networks (PSTN), or a combination of networks. Each of the private networks may include one or more wired and/or wireless links.

The wireless communications device 102 may comprise, among other possibilities, a cellular wireless base station, a two-way radio repeater (perhaps complying with a standard such as ETSI TS 102 361 DMR standard and/or ETSI dPMR), an IEEE 802-based wireless access point, or other wireless communication device capable of communicating with one or more client devices 108 within a range 106. The wireless communications device 102 provides a mechanism through which client devices 108 can communicate with one another and/or location-based services device 112. The wireless communications range 106 determines a coverage area 104 in which connections may be established between fixed or roaming client devices 108. Although coverage area 104 is illustrated in FIG. 1 as being concentrically circular in shape, the actual shape of the coverage area 104 will vary based on environmental characteristics such as land topography, buildings, and antenna radiation directions. Furthermore, although only one wireless communications device 102 is illustrated in FIG. 1, the disclosure is not limited to such, and other embodiments may include more than one wireless communications device with coverage areas distinct from, or overlapping with, coverage area 104. Such additional communications devices may be coupled directly or indirectly with communications device 102 and/or location-based services device 112, perhaps through switch device 110.

Wireless communications device 102 may be equipped with a location determination module, such as a global positioning system (GPS) receiver, and may be configured to share its position with switch device 110 and/or location-based services device 112.

Client devices 108 may take the form of a mobile or a fixed terminal. For example, the client devices 108 may comprise, among other possibilities, a cellular phone, a two-way radio, and an IEEE 802-based wireless node, etc. Client devices are also equipped with a location determination module, such as a GPS receiver, and may be configured to share their position with other client devices or perhaps with location-based services device 112. Location data may be shared with other network devices or client devices upon request or at periodic intervals. For example, client devices 108 may be used by an emergency services group, and location data may be shared amongst members of the group so that any one member in the group can know the location of all others in the group. As another example, location data may be shared with location-based services device 112 to obtain geographically relevant information, such as nearby restaurants or hospitals. Other examples exist as well.

Switch device 110 may be any communications device configured to link the wireless communications device 102 (and thus client devices 108) with location-based services device 112, and may include, for example, a switch, a router, a gateway, etc. For example, the switch device may be a mobile switching center (MSC) in a cellular network or a zone controller in a two-way radio network, among other possibilities. Switch device 110 may also be equipped with a location determination module, such as a GPS receiver.

In order to reduce consumption of communications system resources during the transmission of location data, client devices 108 are configured to obtain their location in the form of latitude and longitude coordinates, and to compress the coordinates prior to transmission to the network devices of FIG. 1. As a result of the compression, the compressed latitude and longitude coordinates are no longer sufficient to identify an absolute location of the client device and/or may identify a region so large as to be unuseful in identifying a location of the client device. A network device such as the wireless communications device 102 may decompress the compressed coordinates, and obtain decompressed latitude and longitude coordinates sufficient to again identify an absolute location of the client device, by itself, or may forward the compressed coordinates, perhaps along with its own compressed or decompressed coordinates, to switch device 110 for decompression. After decompression, the decompressed coordinates may be provided to another client device 108 or to location-based services device 112 for further processing.

Further, it is to be understood that the communication system 100 is only a logical representation of connections between client devices 108, wireless communications device 102, switch device 110, and location-based services device 112, and thus represents only one possible arrangement of interconnected communications elements in communications system 100. For example, the communication system 100 can be extended to include more than two client devices, more than one wireless communications device 102 in the manner noted above, more than one switch device 110, and/or more than one location-based services device 112.

Figure 2:
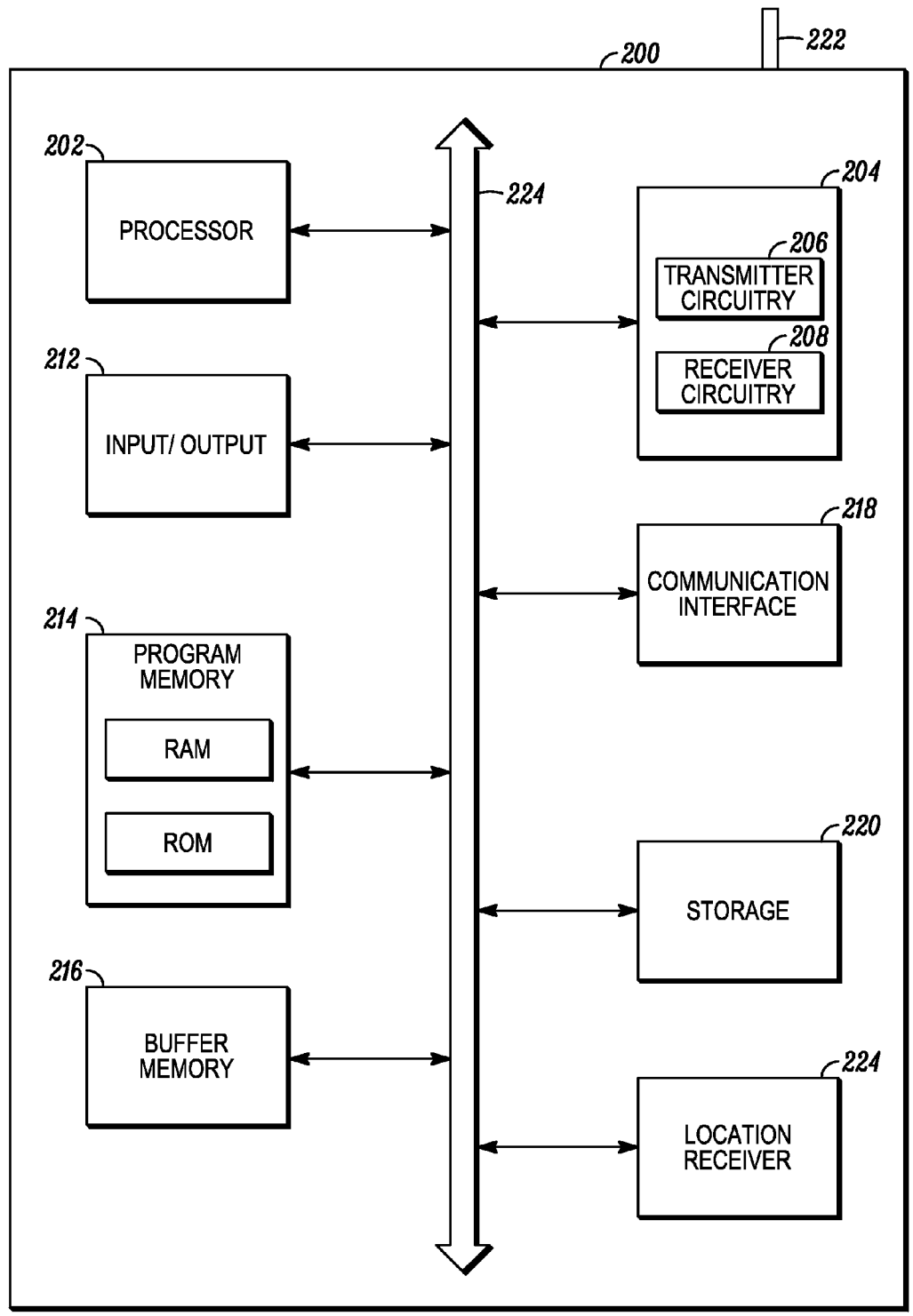
FIG. 2 is a block diagram illustrating further detail of a client device and wireless communications device employed in the communication system shown in FIG. 1.

FIG. 2 is a block diagram illustrating further detail of a computing device 200 that may perform the functions of the client device 108, the wireless communication device 102, and/or the switch device 110. More specifically, FIG. 2 sets forth an example computing structure that may be used for each of the client device 108, the wireless communication device 102, and the switch device 110. Program instructions stored in a memory of the computing device 200 may determine what role and what functions the computing device 200 provides. Variations in the computing device unique to each of the client device 108, the wireless communication device 102, and the switch device 110 will be distinguished as necessary in the forthcoming description.

The computing device 200 may contain, among other components, a processor 202, a transceiver 204 including transmitter circuitry 206 and receiver circuitry 208, an antenna 222, I/O devices 212, a program memory 214, a buffer memory 216, one or more communication interfaces 218, removable storage 220, and a location receiver 224. The computing device 200 is preferably an integrated unit and may contain at least all the elements depicted in FIG. 2 as well as any other element necessary for computing device 200 to perform its electronic functions. The electronic components are interconnected by a bus 226.

The processor 202 may include one or more microprocessors, microcontrollers, DSPs, state machines, logic circuitry, or any other device or devices that process information based on operational or programming instructions. Such operational or programming instructions are stored in the program memory 214 and may include instructions consistent with the algorithms set forth in FIGS. 4 and 6, and accompanying text, for compressing and decompressing location coordinates, as well as information related to the transmission of signals such as modulation, transmission frequency, transmission protocols, addressing, signal amplitude, etc. The program memory 214 may be an IC memory chip containing any form of random access memory (RAM) and/or read only memory (ROM), a floppy disk, a compact disk (CD) ROM, a hard disk drive, a digital video disk (DVD), a flash memory card or any other medium for storing digital information. One of ordinary skill in the art will recognize that when the processor 202 has one or more of its functions performed by a state machine or logic circuitry, the memory 214 containing the corresponding operational instructions may be embedded within the state machine or logic circuitry. The operations performed by the processor 202 and the rest of the computing device 200 are described in more detail below.

The transmitter circuitry 206 and the receiver circuitry 208 enable the computing device 200 to respectively transmit and receive wireless communication signals. In this regard, the transmitter circuitry 206 and the receiver circuitry 208 include appropriate circuits to enable wireless transmissions. The implementations of the transmitter circuitry 206 and the receiver circuitry 208 depend on the implementation of the computing device 200 and the devices with which it is to communicate. For example, the transmitter and receiver circuits 206, 208 may be implemented as part of the computing device hardware and software architecture in accordance with known techniques. For example, transmitter and receiver circuits may be configured to communicate with one or more wireless communications protocols such as Bluetooth transceiver, Wi-Fi perhaps in accordance with an IEEE 802.11 standard (e.g., 802.11a, 802.11b, 802.11g), WiMAX perhaps operating in accordance with an IEEE 802.16 standard, global system for mobile communications (GSM) cellular, code division multiple access (CDMA), P25, ETSI TS 102 361 DMR, ETSI dPMR, NXND, terrestrial trunked radio (TETRA) and/or other types of wireless transceivers configurable to communicate via a wireless network.

One of ordinary skill in the art will recognize that most, if not all, of the functions of the transmitter or receiver circuitry 206, 208 may be additionally or alternatively be implemented in a processor, such as the processor 202. The buffer memory 216 may be any form of volatile memory, such as RAM, and is used for temporarily storing received or transmit information and/or portions of the program memory 214.

The computing device 200 may also contain a variety of I/O devices accessible via I/O circuits 212, such as a keyboard with alpha-numeric keys, a display (e.g., LED, OELD) that displays information about the repeater or communications connected to the repeater, soft and/or hard keys, touch screen, jog wheel, a microphone, and a speaker.

Storage 220 can be an IC (integrated circuit) memory chip containing any form of RAM (random-access memory), a floppy disk, a CD-RW (compact disk with read write), a hard disk drive, a DVD-RW (digital versatile disc with read write), a flash memory card, external subscriber identity module (SIM) card or any other medium for storing digital information. One of ordinary skill in the art will recognize that when the processor 202 has one or more of its functions performed by a state machine or logic circuitry, the storage 220 containing the corresponding operational instructions can be embedded within the state machine or logic circuitry, and may be accessible to the processor 202 directly, or indirectly via buffer memory 216.

The communication interface 218 includes appropriate hardware and software architecture in accordance with known techniques that enable communication of data. Communication interfaces 218 may include additional wired and/or wireless interfaces for communicating with other devices. For example, communication interfaces 218 may be a wired line device such as an Ethernet transceiver, a Universal Serial Bus (USB) transceiver, or similar transceiver configurable to communicate via a twisted pair wire, a coaxial cable, a fiber-optic link or other physical connection to a wireline network. Such a wireline network may couple, for example, wireless communications device 102 with switch device 110, or switch device 110 with location-based services device 112, among other possibilities.

Antenna 222 may comprise any known or developed structure for radiating and receiving electromagnetic energy in a desired frequency range containing corresponding wireless carrier frequencies for wireless communicating between one or more of client devices 108, wireless communications device 102, and/or switch device 110.

Location receiver 224 may comprise any known or developed circuit for determining a location of the computing device 200. For example, location receiver 224 may be a GPS receiver capable of providing absolute coordinates based on reception of three or more signals from orbiting GPS satellites. Other types of location determination methods could be implemented in location receiver 224 as well, including triangulation with three or more base stations, among other possibilities.

II. Location Data Transmission Payloads

Figure 3:
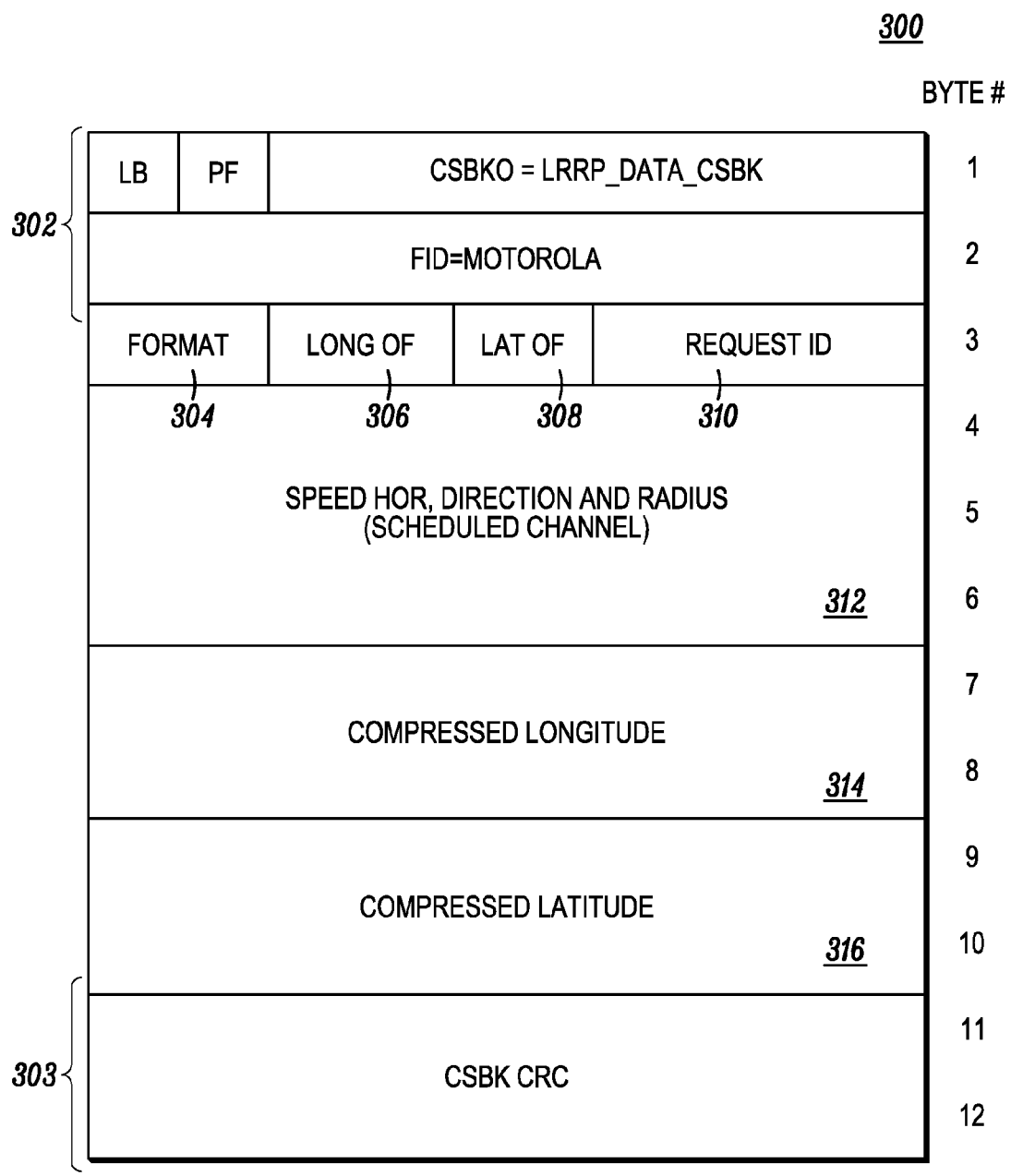
FIG. 3 illustrates an example location payload packet format including compressed location coordinates for transmission between a client device and a wireless communications device employed in the communication system shown in FIG. 1.

FIG. 3 sets forth one example of a packet format for transmitting location information from a client device 108, such as client device 108a or client device 108b, to wireless communications device 102 and/or switch device 110. Of course, other packet formats could additionally or alternatively be used, and other methods of encoding location information in a transmission could additionally or alternatively be used.

Packet format 300 as shown in FIG. 3 includes standard-related information 302, 303 at bytes 1, 2, 11, and 12, format specifier field 304, longitude overflow field 306, latitude overflow field 308, and request ID field 310 at byte 3, speed, direction, or radius value field 312 at bytes 4-6, truncated longitude value field 314 at bytes 7-8, and truncated latitude value field 316 at bytes 9-10. The example packet format of FIG. 3 is formatted to comply with the control signaling block (CSBK) requirements of Digital Mobile Radio (DMR), as embodied in European Telecommunications Standards Institute ETSI TS 102 361-1 V1.4.5 (2007-12). The standard-related information 302, 303 may include information required by the DMR standard, such as manufacturer feature identification (FID), a cyclic-redundancy check (CRC), etc. Accordingly, only bytes 3-10 will discussed in detail herein.

At byte 3 of the packet format 300, format field 304 may describe the contents of the packet (e.g., location information, speed, result codes, etc.). The longitude overflow field 306 may provide additional bits for those instances where more than the 16 bits of longitude information available in bytes 7-8 are required. For example, longitude overflow field 306 may provide an additional 2 bits of longitude coordinates. The latitude overflow field 308 may provide additional bits for those instances where more than the 16 bits of latitude information available in bytes 9-10 are required. For example, latitude overflow field 308 may provide an additional 1 bit of latitude coordinates. The Request ID field 310 may be used to indicate an event associated with the geographic location update, e.g., a trigger or detection event in response to which the packet format 300 is being transmitted.

At bytes 4-6 of the packet format 300, a speed, direction, and/or radius field 312 of the client device 108 may be provided. For example, the speed and direction values may be useful in predicting a future position of the client device 108, and/or locations of interest along an expected path of the client device 108. Other uses are possible as well. In some embodiments, speed, direction, and/or radius field 312 may be removed in order to allow for a 24-bit source ID field to be included in the packet format 300 when sent on a non-scheduled GPS channel.

At bytes 7-8, a compressed (truncated) longitude value field 314 is provided. Combining the 16-bits available at bytes 7-8 and the 2-bits available at longitude overflow field 306, an 18-bit compressed longitude coordinate can be transmitted in the packet format 300.

At bytes 9-10, a compressed (truncated) latitude value field 316 is provided. Combining the 16-bits available at bytes 9-10 and the 1-bit available at latitude overflow field 308, a 17-bit compressed latitude coordinate can be transmitted in the packet format 300.

The packet format 300 facilitates the compression of 32-bit longitude and latitude coordinates into a compressed 18-bit longitude coordinate and a compressed 17-bit latitude coordinate, thereby effectively compressing 64 total bits of latitude/longitude information down to 35 bits or less. It is important to note that the packet format 300 is just one example of a packet format that can be used to transmit compressed location coordinates consistent with this disclosure. Other packet formats could be used as well, including fields accommodating both larger and smaller compressed longitude and latitude coordinates than that illustrated in FIG. 3. For example, 64-bit longitude and latitude coordinates could be compressed into perhaps 34-bit compressed latitude and 36-bit compressed longitude coordinates, thereby effectively compressing 64 total bits of latitude/longitude information down to 35 bits or less. Other possibilities exist as well.

The packet format 300 populated with fields 302-316 may be transmitted by client device 108 upon request and/or at periodic intervals, to either provide its location to another client device 108 or to location-based services device 112, or to provide some form of location-based service to a user of the client device 108, among other possibilities. Upon receipt, wireless communications device 102 and/or switch device 110 may retrieve the compressed longitude and latitude values from the packet format 300, and consistent with the remaining disclosure, decompress the longitude and latitude values to re-create an absolute location of the client device 108.

III. Location Data Compression and Decompression Operational Examples

Figure 4:
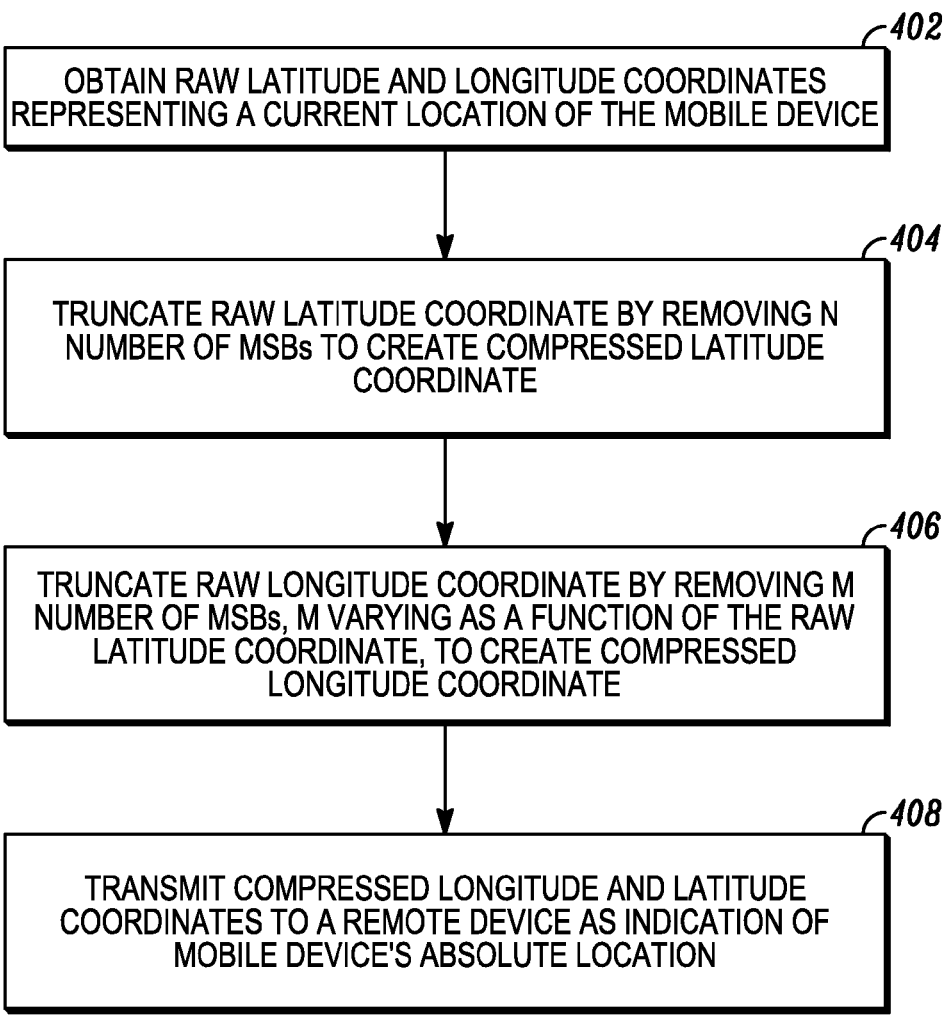
FIG. 4 is a flow chart illustrating an example of a client device obtaining its location coordinates, compressing the coordinates, and transmitting the compressed coordinates to the wireless communications device in the communication system shown in FIG. 1.
Figure 5B:
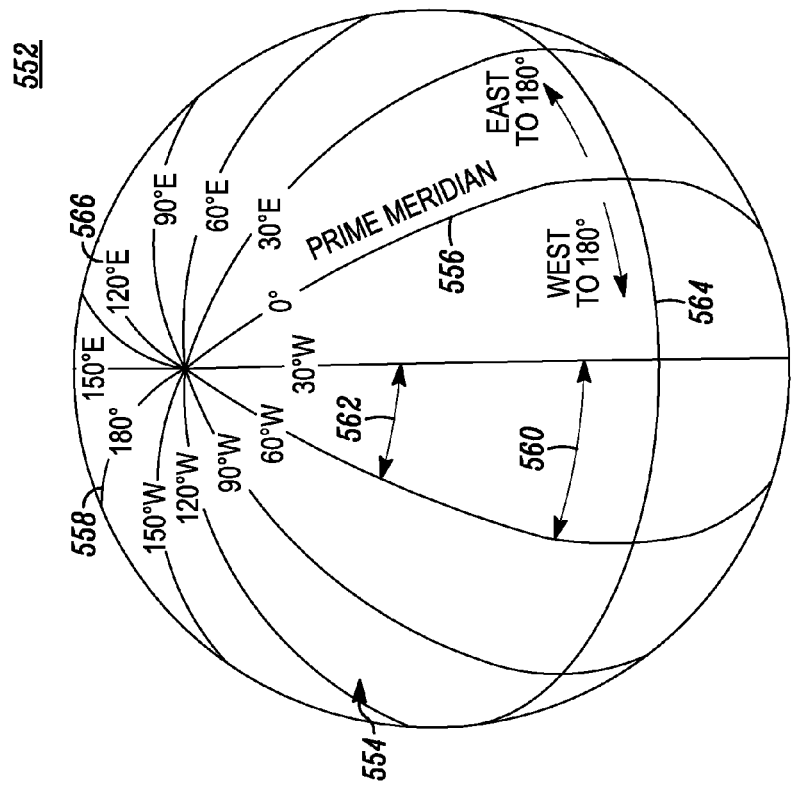
FIGS. 5A and 5B illustrate the use of latitude and longitude coordinates in identifying location, and how location resolution of longitude coordinates varies based on latitude.
Figure 5A:
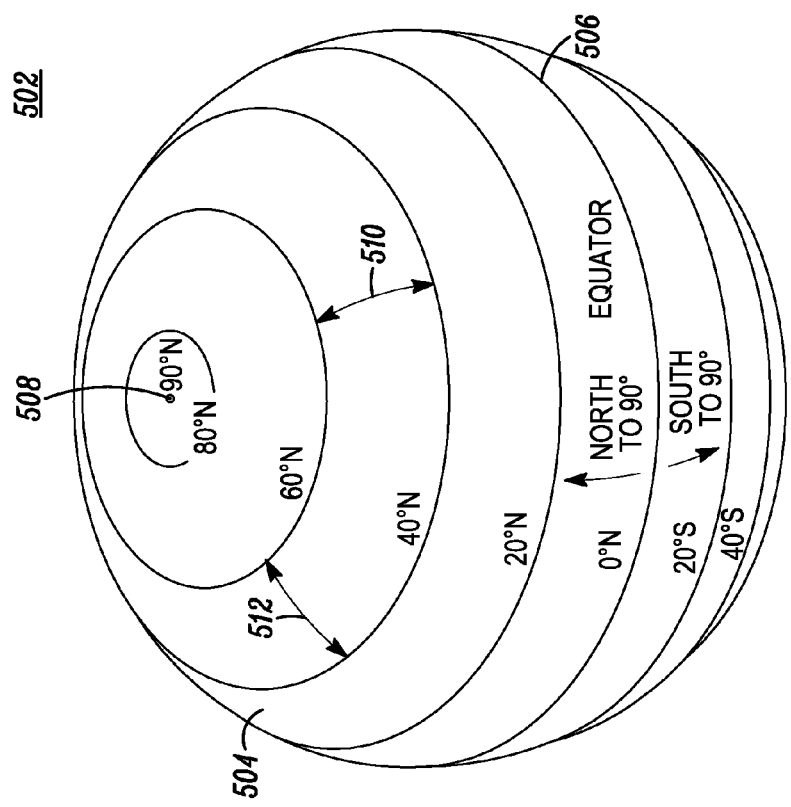
Figure 6:
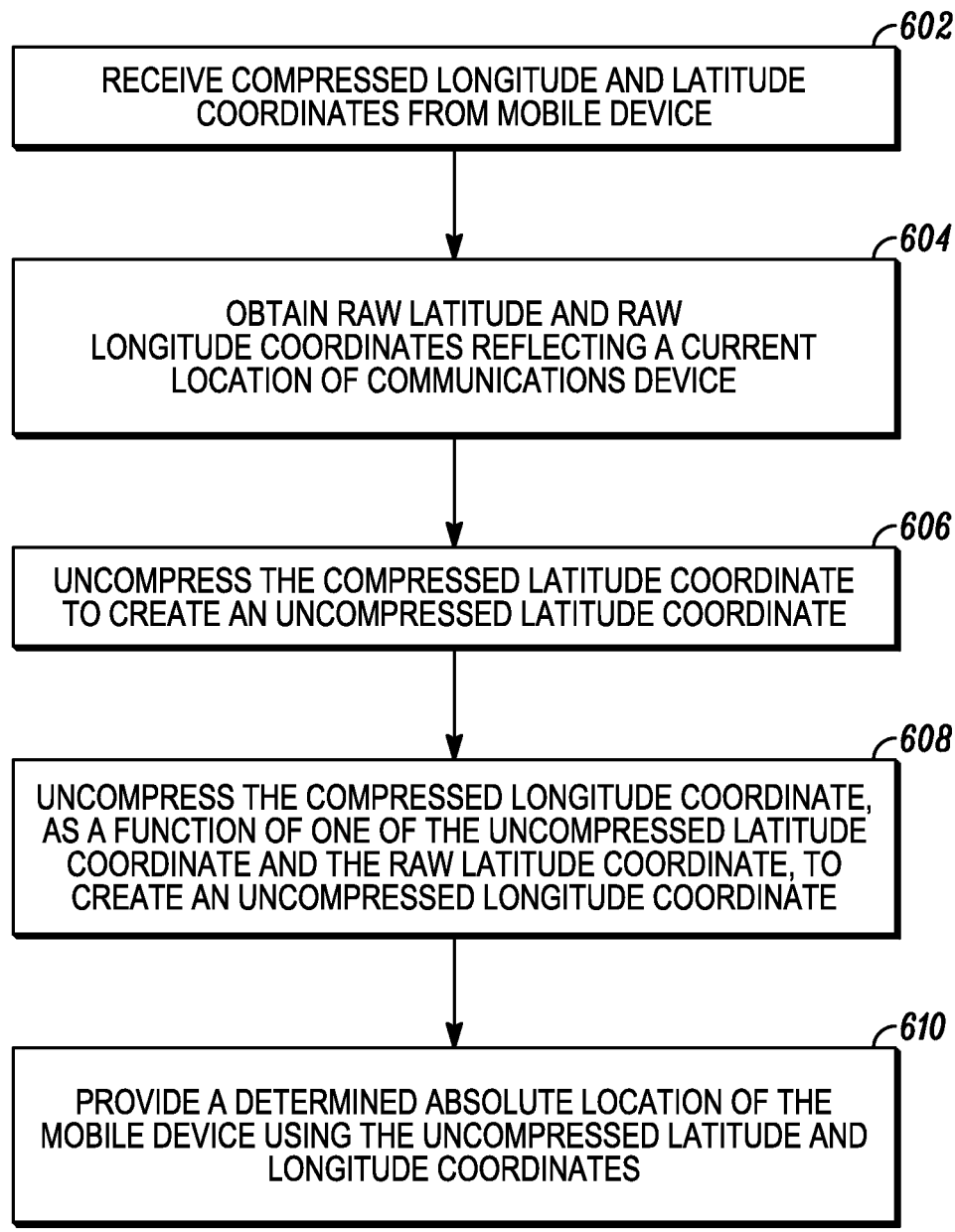
FIG. 6 is a flow chart illustrating an example of a network device receiving compressed client device location coordinates, decompressing the coordinates, and providing an absolute location of the client device in the communication system shown in FIG. 1.

FIGS. 4 and 6 set forth flowcharts illustrating methods 400 and 600 of compressing and decompressing obtained (compressed) latitude and longitude coordinates consistent with the longitude and latitude system described in FIGS. 5A and 5B. Method 400 may be executed at each client device 108 upon request or on a periodic or intermittent basis, and method 600 may be executed at one or more of wireless communications device 102 and switch device 110 in response to receiving a location packet, such as packet format 300, from a client device 108.

At step 402 of method 400, a client device obtains raw latitude and longitude coordinates representing a current location of the client device. In one example, the coordinates are provided by a GPS receiver in the form of 32-bit encoded longitude and latitude coordinates. Other types of location receivers and other encodings could be used as well.

At step 404 the raw latitude coordinate provided by a location receiver is truncated to reduce the size of the coordinate for wireless transmission and by creating a compressed latitude coordinate. As a result of the reduction in size, the compressed latitude coordinate may no longer identify a unique location on the surface of the Earth, and/or may identify a region so large as to be unuseful in identifying a location of the client device. FIG. 5A illustrates how latitude coordinates 502 are used to uniquely identify a location on Earth. Specifically, latitude represents a north-south location, and it is shown on a map or globe by a series of east-west running lines (parallels) 504 that parallel the equator 506, which marks the midpoint between the two poles, and extend all around the Earth's circumference. The North Pole 508 has a latitude of 90° N, while the South Pole (not shown) has a latitude of 90° S, with the equator marking the 0° intermediate point.

Importantly, spacing between latitude parallels, as measured on an outer surface of the earth, does not vary around the Earth. For example, the distance 510 between adjacent latitude lines is consistent around the circumference of the Earth, such that the distance 510 is, for example, equal to the distance 512. Because the distance 510/512 does not change, a static selection and/or number of bits from the raw latitude coordinate generated at step 402 can be truncated to create the compressed latitude coordinate. In other words, the selection and/or number of bits truncated from a raw latitude coordinate does not need to change based on a longitudinal location of the client device (e.g., as the client device moves east or west along the circumference of the globe in FIG. 5A). For example, at least "n" number of most significant bits (MSBs) of the raw latitude coordinate may be truncated. As a result of the truncation of the MSBs, the compressed latitude coordinate may match a plurality of latitudinal locations along the Earth, e.g., the compressed latitude coordinate may no longer identify a unique location on the surface of the Earth, and/or may identify a region so large as to be unuseful in identifying a location of the client device.

Additionally, "s" number of least significant bits (LSBs) of the raw latitude coordinate may also be truncated. As a result of the truncation of the LSBs, the compressed latitude coordinate may not provide as high a resolution of location as the original raw latitude coordinate provided (e.g., providing a determination of a location of the client device within 7.5-30 feet of its actual location using the compressed latitude coordinate as opposed to within 3 feet using the raw latitude coordinate). By sacrificing some resolution, the compressed latitude coordinate can be further reduced in size. As noted earlier, "s" and "n" can be applied consistently to the raw latitude coordinate without variation based on the longitudinal location of the client device.

TABLE I

| | Resolution | | | | Range | | | |
|---|---|---|---|---|---|---|---|---|
| N | ... | 9 | 10 | 11 | ... | 25 | 26 | 27 | ... |
| $2^N$ | ... | $2^9$ | $2^{10}$ | $2^{11}$ | ... | $2^{25}$ | $2^{26}$ | $2^{27}$ | ... |
| Distance | ... | 7.5 Feet | 15 feet | 30 Feet | ... | 97.5 Miles | 195 miles | 389 miles | ... |

$$\text{Resolution}_{Latitude} = \pi \times \text{Radius}_{Earth} \times 2^{(N-N_{Max})} \times \text{FeetPerMile}$$

and $$\text{Range}_{Latitude} = \pi \times \text{Radius}_{Earth} \times 2^{(N-N_{Max})}$$

where, $\text{Radius}_{Earth}=3959$ miles and $\text{FeetPerMile}=5280$.

For Table 1, $N_{Max}=32$, Resolution is given in feet and Range is given in miles.

Table I illustrates the bit ranges that can be used in a compressed latitude coordinate to provide the range and resolution indicated. For example, LSBs in bit positions 0-8 can be truncated and still provide latitude resolution up to 7.5 feet. Other selections of LSBs can be selected based on the contents of Table I. MSBs in bit positions 28-31 can be removed prior to transmission to a network communications device providing wireless communications service to the client device without permanent loss of that data. This is because the MSBs removed at the client device can be restored at the network communications device (or other upstream device) as long as the wireless range of the network communications device is equal to or less than the range indicated in Table I above (for example, 389 miles if truncated bits 28-31). If the range of the network communications device is greater than half of the range indicated, the network communications device may incorrectly restore the MSBs for a client device transmitting location information from a location that is farther from the network communications device than the range indicated in Table I. Other selections of latitude MSBs can be selected based on the contents of Table I.

While Table I illustrates how the truncated bit-range of a latitudinal coordinate can be truncated for 32-bit encoded latitude values, similar tables can be created for other encodings, including, for example, 64-bit encoded latitude values.

Returning to FIG. 4, at step 406, the raw longitude coordinate provided by the location receiver is truncated to reduce the size of the longitude coordinate for wireless transmission by creating a compressed longitude coordinate. As a result of the reduction in size, the compressed longitude coordinate may no longer identify a unique location on the surface of the Earth, and/or may identify a region so large as to be unuseful in identifying a location of the client device. FIG. 5B illustrates how longitude coordinates 552 are used to uniquely identify a location on Earth. Specifically, longitude represents east-west location, and it is shown on a map or globe by a series of north-south running lines 554 that all come together at the North Pole and at the South Pole. These lines of longitude 554 are called "meridians." The prime meridian is at 0°, and additional meridians progress east and west along the circumference of the globe until they meet at the 180° mark 558 on the opposite side of the Earth from the prime meridian.

In contrast to latitude parallel spacing, spacing between longitude meridians does vary between adjacent meridians between the North and South Poles. For example, the distance 560 between adjacent longitude meridians near the equator 564 is different than the distance 562 between adjacent longitude meridians closer to the North Pole 566. Because the distance 560/562 does change based on latitude, a static selection and/or number of bits from the raw longitude coordinate generated at step 402 cannot be truncated to create compressed longitude coordinates having consistent resolutions and ranges. In other words, the selection and/or number of bits truncated from a raw longitude coordinate needs to change based on a latitudinal location of the client device (e.g., as the client device moves north or south along the circumference of the globe in FIG. 5B) in order to maintain a consistent resolution and range across the Earth from North Pole to South Pole, and relative to the static latitude resolution and range.

TABLE II

| $2^{\hat{}}N$ | N | | | | | | | |
|---|---|---|---|---|---|---|---|---|
| | 7 $2^{\hat{}}7$ | 8 $2^{\hat{}}8$ | 9 $2^{\hat{}}9$ | 10 $2^{\hat{}}10$ | 11 $2^{\hat{}}11$ | 12 $2^{\hat{}}12$ | 13 $2^{\hat{}}13$ | 14 $2^{\hat{}}14$ |
| Lat = 0° | 4 f | 8 f | | | | | | |
| Lat = 45° | 3 f | 6 f | 12 f | 24 f | | | | |
| Lat = 69.30° | | | 6 f | 12 f | | | | |
| Lat = 79.82° | | | | 6 f | 12 f | | | |
| Lat = 83.93° | | | | | 6 f | 12 f | | |
| Lat = 87.47° | | | | | | 6 f | 12 f | |
| Lat = 88.73° | | | | | | | 6 f | 12 f |

$$Resolution_{Longitude} =$$

$$2\pi \times Radius_{Earth} \times \cos\left(\frac{2\pi \times Latitude_{Degrees}}{360}\right) \times 2^{(N-N_{max})} \times FeetPerMile$$

TABLE III

| $2^{\hat{}}N$ | N | | | | | | |
|---|---|---|---|---|---|---|---|
| | 25 $2^{\hat{}}25$ | 26 $2^{\hat{}}26$ | 27 $2^{\hat{}}27$ | 28 $2^{\hat{}}28$ | 29 $2^{\hat{}}29$ | 30 $2^{\hat{}}30$ | 31 $2^{\hat{}}31$ |
| Lat = 0° | 194.5 mi | 389 mi | | | | | |
| Lat = 45° | 137.5 mi | 275 mi | 550 mi | | | | |
| Lat = 69.30° | 68.8 mi | 137.5 mi | 275 mi | 550 mi | | | |
| Lat = 79.82° | | 68.8 mi | 137.5 mi | 275 mi | 550 mi | | |
| Lat = 83.93° | | | 68.8 mi | 137.5 mi | 275 mi | 550 mi | |
| Lat = 87.47° | | | | 68.8 mi | 137.5 mi | 275 mi | 550 mi |
| Lat = 88.73° | | | | | 68.8 mi | 137.5 mi | 275 mi |

$$Range_{Longitude} =$$

$$2\pi \times Radius_{Earth} \times \cos\left(\frac{2\pi \times Latitude_{Degrees}}{360}\right) \times 2^{(N-N_{max})}$$

Tables II and III illustrate the bit ranges that can be used in a compressed longitude coordinate, as a function of latitude coordinate, to provide the range and resolution indicated.

For example, "m" number of MSBs of the raw longitude coordinate may be truncated consistent with Table III above. Table III illustrates the bit ranges that can be used, as a function of the current latitudinal location of the client device, in a compressed longitude coordinate to provide consistent ranges and resolutions. For example, for raw latitude coordinates between 45° and 69.30°, the MSBs 27-31 may be truncated to create a compressed longitude coordinate having a range of approximately 275 miles and resolution of 12 feet or better. MSBs 27-31 can be removed prior to transmission to a network communications device providing wireless communications service to the client device without permanent loss of these MSBs. This is because, as with the latitude coordinates, the MSBs removed at the client device can be restored at the network communications device (or other upstream device) as long as the wireless range of the network communications device is equal to or less than half of the range indicated in Table III above. For raw latitude coordinates between 45° and 69.30°, the network communications device can restore the truncated MSBs, using knowledge of its own location, as long as the network communications device has a wireless communications range less than that indicated Table III (e.g., 137.5 miles, 275 miles, and 550 miles depending on the number of MSBs removed prior to transmission). If the range of the network communications device is greater than the range indicated for the selected number of truncated MSBs, the network communications device may incorrectly restore the MSBs for a client device transmitting location information from a location that is farther from the network communications device than the maximum range indicated in Table III.

While Table III illustrates how the truncated bit-range of a longitudinal coordinate will change based on a current latitudinal location of the client device for 32-bit encoded latitude and longitude values, similar tables can be created for other encodings, including, for example, 64-bit encoded latitude and longitude values. Whatever the precision and encoding used, the truncation applied to the longitude coordinates must be varied based on the current determined latitudinal location of the client device to maintain consistency in location range and resolution for compressed location coordinates.

Additionally, "r" number of LSBs of the raw longitude coordinate may also be truncated, as indicated in Table II. As a result of the truncation of the LSBs, the compressed longitude coordinate may not provide as high a resolution of location as the original raw longitude coordinate (e.g., providing a determination of a location of the client device within 7.5-15 feet of its actual location using the compressed longitude coordinate as opposed to within 3 feet using the raw longitude coordinate). By sacrificing some resolution, the compressed longitude coordinate can be further reduced in size. Similar to "m," "r" must be varied as a function of the current latitudinal location of the client device in order to maintain consistency in range and resolution, as illustrated in Table II, for example, above.

Returning to FIG. 4, at step 408, the client device transmits the compressed longitude and latitude coordinates to a network device, such as the wireless communications device 102 and/or the switch device 110 for decompression consistent with method 600 set forth in FIG. 6.

Method 600 for decompressing compressed longitude and latitude coordinates may be executed at any one of wireless communications device 102, switch device 110, and/or location-based services device 112. Any differences in the method 600 based on where the method is executed will be described with respect to each of steps 602-610, below.

At step 602, the compressed longitude and latitude coordinates are received from the client device, where the compressed longitude and latitude coordinates were compressed consistent with the method set forth in FIG. 4. At step 604, raw network latitude and longitude coordinates are obtained of one or more of the devices receiving the compressed longitude and latitude coordinates. For example, if the wireless communications device 102 is executing the method 600, it may obtain its own raw network latitude and longitude coordinates via a location receiver, such as location receiver 224 of FIG. 2, or it may be provided with its location via an upstream device such as switch device 110. If the switch device 110 is executing the method 600, it may obtain its own location via a location receiver 224 (assuming it is co-located with wireless communications device 102, for example), or it may be provided with raw network latitude and longitude coordinates of the wireless communications device 102 by the wireless communications device 102, via a local database lookup, or perhaps via an upstream network device such as location-based services device 112. Finally, if the location-based services device 112 is executing the method 600, it may obtain raw network latitude and longitude coordinates from one or more of the wireless communications device 102, the network communications device 110, or some other upstream or downstream device not illustrated in FIG. 1.

In any event, once the raw network latitude and raw network longitude coordinates are obtained in step 604, the compressed latitude coordinate is decompressed using the raw network latitude coordinate at step 606. The decompression process involves several sub-steps in re-creating an accurate absolute location of the client device using the obtained raw network latitude coordinate. First, the received compressed latitude coordinate is compared to a same bit range of the raw network latitude coordinate to determine whether remaining MSBs of the raw network latitude coordinate (e.g., those more significant bits not participating in the comparison and equivalent to the MSB bit positions that were truncated at the client device) should be incremented or decremented to accurately reflect the absolute location of the client device (and re-create the truncated MSBs from the client device). This situation is more clearly illustrated with reference to FIG. 7.

Figure 7:
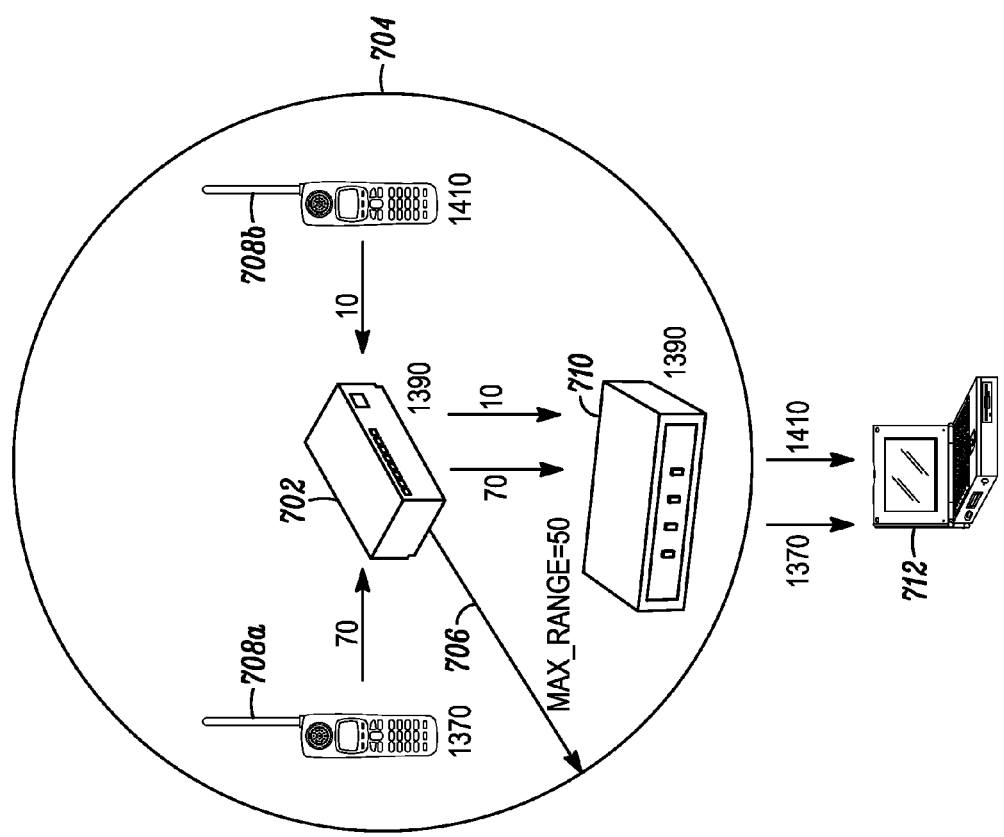
FIG. 7 is a block diagram illustrating a simplified example of the method and system for compressing location data of a radio for over-the-air transmission.

FIG. 7 is a block diagram illustrating an example a communication system 700 employing a simplified example method and system for compressing location data of a radio for over-the-air transmission. The communication system 700 comprises a wireless communications device 702 having a coverage area 704 defined by a communications range 706, one or more client devices 708, a switch device 710, and a location-based services device 712, all corresponding to similar device already described with respect to FIG. 1. Simply for ease of description, short decimal encodings of latitude locations of respective devices are provided in FIG. 7. For example, decimal 1390 may be representative of a latitude portion of a geographic location at 42° 3'58.68"N latitude/88° 3'2.82"W longitude. Other decimal encoding values in FIG. 7 are set relative to the 1390 decimal encoding for illustration purposes.

As shown in FIG. 7, the range 706 of the wireless communications device 702 is 50 (miles, kilometers, etc.), and a decimal latitude encoding of the location of the wireless communications device 702 is assumed to be 1390. A decimal latitude encoding of client device 708a is assumed to be 1370 (within the range 706) and a decimal latitude encoding of client device 708b is assumed to be 1410 (also within the range 706). In accordance with the compression algorithm set forth herein, each of the client devices 708a and 708b compress their latitude location encoding by truncating the two most significant digits and transmitting their respective compressed latitude encodings (70 and 10, respectively) to wireless communications device 702. While FIG. 7 illustrates wireless communication device 702 forwarding the compressed latitude coordinates to switch device 710 for decompression, in another embodiment, wireless communication device 702 could decompress the compressed latitude coordinates itself.

In any event, once switch device 710 receives the compressed latitude encodings, it obtains a raw decimal latitude encoding (either its own or of the wireless communications device 702, depending on the communications system 700 structure). In this case, the raw decimal latitude encoding (reflecting the geographic location of one of the wireless communication device 702 and the switch device 710) is assumed to be 1390.

At this point in the decompression process, if the switch device 710 were to simply concatenate the remaining MSBs of the raw network latitude encoding (13) onto the compressed latitude encodings (70 and 10, respectively) of the client devices 708a and 708b, the resultant decompressed latitude encoding values 1370 and 1310 would not accurately reflect the original and proper latitude encodings of 1370 and 1410. More specifically, before concatenation, we must first determine whether the remaining MSBs of the raw decimal latitude encoding (13) must be incremented or decremented to accurately reflect the original and proper decimal latitude encoding values of the client devices 708a and 708b (prior to truncation/compression). The potential to miscalculate the original decimal latitude encoding values will occur whenever the reference device (here, the wireless communications device 702) has a maximum range (here, 50) that, when added or subtracted from the raw decimal latitude encoding (here, 1390) of the wireless communications device 702, causes the remaining MSBs (e.g., those MSBs in positions that were truncated at the client stations 708) of the raw decimal latitude encoding to change.

Accordingly, a mathematical operation and comparison is executed at the switch device 710 to determine whether the remaining MSBs in the raw decimal latitude encoding need to be incremented or decremented prior to concatenation with the received compressed latitude encodings. In a first comparison, if subtracting bits of the raw decimal latitude encoding corresponding to bit positions of the received compressed latitude encodings from the received compressed latitude encodings results in a number less than the negative of the maximum range, the remaining MSBs in the raw decimal latitude encoding are incremented prior to concatenation. For client device 708a, the mathematical operation and comparison amounts to 70-90<−50, which is false, such that, subject to a second comparison, the remaining MSBs in the raw decimal latitude encoding may be concatenated to the compressed latitude encoding without modification, resulting in a decompressed latitude encoding of 1370 for client device 708a. For client device 708b, the mathematical operation and comparison amounts to 10-90<−50, which is true, such that the remaining MSBs in the raw decimal latitude encoding are incremented and then concatenated to the compressed latitude encoding, resulting in a decompressed latitude encoding of 1410 for client device 708b.

In the second comparison, if subtracting bits of the raw decimal latitude encoding corresponding to bit positions of the received compressed latitude encoding from the received compressed latitude encoding results in a number greater than the maximum range, the remaining MSBs in the raw decimal latitude encoding are decremented prior to concatenation. For client device 708a, the mathematical operation and comparison amounts to 90-70>50, which is false, such that, since both the first and second comparisons failed, the remaining MSBs in the raw decimal latitude encoding are concatenated to the compressed latitude encoding without modification, resulting in a decompressed latitude of 1370 for client device 708a.

Since the first comparison already succeeded for client device 708b, we need not execute the second comparison, however, since the order of comparisons is immaterial, we will present the second comparison for completeness and in the event that the second comparison is executed prior to or in parallel with the first comparison. For client device 708b, the mathematical operation and comparison amounts to 10-90>50, which is false, such that the remaining MSBs in the raw decimal latitude encoding are not decremented prior to concatenation to the compressed latitude encoding, but may be (and in fact are) incremented subject to the first comparison.

Returning to FIG. 6, once the decompressed latitude encodings are obtained at step 606, the decompressed longitude encodings are obtained at step 608. The decompression process at step 608 is substantially the same as that set forth above with respect to step 606, with the exception that the bit positions of the compressed longitude encoding vary based on latitude, and thus, the comparison of bits between the compressed longitude encoding and the raw decimal longitude encoding must take into consideration this variation. Accordingly, for example with reference to Table I above, for a compressed longitude encoding associated with one of a decompressed latitude coordinate and raw network latitude coordinate in the range of 45° to 69.30°, the bits of the compressed longitude encoding will be compared to bits 0-27 (or some sub-portion thereof depending on desired resolution and range) of the raw decimal longitude encoding to determine whether to increment or decrement remaining MSBs (bits 28-31) in the raw decimal longitude encoding. Alternatively, for a compressed longitude coordinate associated with one of a decompressed latitude coordinate and raw network latitude coordinate in the range of 69.30° to 79.82°, the bits of the compressed longitude encoding will be compared to bits 0-28 (or some sub-portion thereof depending on desired resolution and/or range) of the raw decimal longitude encoding. Similarly, and as reflected in Table I above, the number of remaining MSBs in the raw decimal longitude encoding that will be concatenated to the compressed longitude encoding to create the decompressed longitude encoding will also vary with latitude. For example, for a compressed longitude encoding associated with one of a decompressed latitude coordinate and raw network latitude coordinate in the range of 45° to 69.30°, 4-5 MSBs of the raw decimal longitude encoding will be concatenated onto the compressed longitude encoding (depending on desired resolution and/or range). Alternatively, for a compressed longitude encoding associated with one of a decompressed latitude coordinate and raw network latitude coordinate in the range of 69.30° to 79.82°, 3-4 MSBs of the raw decimal longitude encoding will be concatenated onto the compressed longitude encoding (depending on desired resolution and/or range).

At step 610, the decompressed longitude and latitude are provided, reflecting the absolute location of the client device 108 to a same, or minimally reduced, resolution compared to the original raw network location data generated at the client device. In some cases, for example above where the latitude is encoded into a decimal or binary format, a decoding is performed to convert the encoded number into a latitude/longitude pair (in degrees, minutes, seconds, or perhaps as a decimal number to the tenth, hundredth, thousandth, or other more precise decimal position).

LSBs truncated in either of the compressed latitude or compressed longitude coordinates are lost and cannot be restored via method 600 (e.g., the compression is lossy). However, and as illustrated in Tables I-III and elsewhere above, a resolution of between 3 and 30 feet can still be maintained while reducing a location transmission CSBK to a single transmission burst. This amounts to a substantial savings in network bandwidth consumption when multiplied over the number of client devices typically transmitting location updates in a typical wireless communications system.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, or article that comprises, has, includes, contains a list of elements does not include only those elements but may include other elements not expressly listed or inherent to such process, method, or article. An element proceeded by "comprises . . . a", "has . . . a", "includes . . . a", "contains . . . a" does not, without more constraints, preclude the existence of additional identical elements in the process, method, or article that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for compressing and transmitting obtained location data reflecting a current location of a client device, the method comprising:
   obtaining, via the client device, raw latitude and raw longitude coordinates reflecting a current location of the client device, the raw latitude coordinate represented by x number of bits and the raw longitude coordinate represented by y number of bits;
   truncating, via the client device, the raw latitude coordinate by removing n number of most significant bits from the raw latitude coordinate to create a compressed latitude coordinate;
   truncating, via the client device, the raw longitude coordinate by removing m number of most significant bits from the raw longitude coordinate to create a compressed longitude coordinate, where m varies as a function of the value of the raw latitude coordinate; and
   wirelessly transmitting, via the client device, the compressed longitude and compressed latitude coordinates to a remote device for decompression and use as an indication of the client device's absolute location.

2. The method of claim 1, wherein m is greater for lower raw latitude coordinate values and lower for greater raw latitude coordinate values.

3. The method of claim 2, wherein m varies between 1 and 6.

4. The method of claim 2, further comprising truncating, via the client device, the raw longitude coordinate by removing r number of least significant bits (LSBs) from the raw longitude coordinate, where r varies as a function of the value of the raw latitude coordinate and inversely with the value of m.

5. The method of claim 2, wherein m decreases in a non-linear fashion as the value of the raw latitude coordinate increases.

6. The method of claim 1, further comprising truncating, via the client device, the raw latitude coordinate by removing s number of least significant bits (LSBs) from the raw latitude coordinate.

7. The method of claim 6, wherein n and s do not vary as a function of the raw latitude or raw longitude coordinates.

8. The method of claim 1, wherein x and y are 32, m varies between 1 and 5, and n varies between 4 and 5.

9. The method of claim 8, further comprising:
   truncating, via the client device, the raw longitude coordinate by removing r number of least significant bits (LSBs) from the raw longitude coordinate, where r varies as a function of the value of the raw latitude coordinate and inversely with the value of m; and
   further comprising truncating, via the client device, the raw latitude coordinate by removing s number of LSBs from the raw latitude coordinate;
   where r varies between 8 and 11 and s is 10.

10. The method of claim 1, wherein the compressed latitude coordinate provides a location resolution of 15 feet and range of 195 to 389 miles, and the compressed longitude coordinate provides a location resolution of between 6 and 12 feet and a range of between 275 and 550 miles.

11. A method for decompressing received compressed longitude and latitude coordinates from a client device at a network device, the method comprising:
   wirelessly receiving, via the network device, compressed longitude and compressed latitude coordinates from a client device;
   obtaining, via the network device, raw network latitude and raw network longitude coordinates reflecting a current location of one of the network device and another network device coupled to the client device;
   decompressing the compressed latitude coordinate received from the client device, via the network device, by:
      comparing the compressed latitude coordinate with a sub-range of the raw network latitude coordinate and, if it is determined that the difference is outside of a maximum wireless range of the one of the network device and the another network device coupled to the client device, modifying remaining most significant bits of the raw network latitude coordinate as a function of the difference;
      concatenating the remaining most significant bits of the raw network latitude coordinate, modified or unmodified, to the compressed latitude coordinate to create a decompressed latitude coordinate;
   decompressing the compressed longitude coordinate received from the client device, via the network device, by:
      comparing the compressed longitude coordinate with a sub-range of bits in the raw network longitude coordinate, wherein the sub-range of bits varies as a function of the value of the one of the decompressed latitude coordinate and the raw network latitude coordinate and, if it is determined that the difference is outside of a maximum wireless range, modifying remaining most significant bits of the raw network longitude coordinate as a function of the difference;
      concatenating the remaining most significant bits of the raw network longitude coordinate, modified or unmodified, to the compressed longitude coordinate to create a decompressed longitude coordinate;
   providing, via the network device, a determined absolute location of the client device using the decompressed latitude and longitude coordinates.

12. The method of claim 11, wherein comparing the compressed latitude coordinate with a sub-range of the raw network latitude coordinate comprises comparing bits of the compressed latitude coordinate with a same number and same position of bits in the raw network latitude coordinate; and
wherein comparing the compressed longitude coordinate with a sub-range of bits in the raw network longitude coordinate comprises comparing all of the bits of the compressed longitude coordinate with a same number and same position of bits in the raw network longitude coordinate, wherein the position of bits in the raw network longitude coordinate varies as a function of the value of the one of the decompressed latitude coordinate and the raw network latitude coordinate.

13. The method of claim 12, wherein the position of bits in the raw network longitude coordinate is lower for lower raw network latitude coordinate values and greater for greater raw network latitude coordinate values.

14. The method of claim 12, wherein the position of bits in the raw network longitude coordinate also does not include r number of least significant bits (LSBs) of the raw network longitude coordinate, where r varies as a function of the value of the one of the decompressed latitude coordinate and the raw network latitude coordinate.

15. The method of claim 12, wherein the position of bits in the raw network longitude coordinate varies in a non-linear fashion as the value of the one of the decompressed latitude coordinate and the raw network latitude coordinate increases.

16. The method of claim 12, wherein comparing bits of the compressed latitude coordinate with a same number and same position of bits in the raw network latitude coordinate does not include s number of least significant bits (LSBs) from the raw network latitude coordinate.

17. The method of claim 16, wherein s does not vary as a function of the raw network latitude or raw network longitude coordinates.

18. The method of claim 12, wherein x and y are 32, the remaining most significant bits of the raw network latitude coordinate concatenated to the compressed latitude coordinate varies from the 4 to 5 most significant bits of the raw network latitude coordinate, and the remaining most significant bits of the raw network longitude coordinate concatenated to the compressed longitude coordinate varies from the 1 to 5 most significant bits of the raw network longitude coordinate.

19. The method of claim 12, wherein providing the determined absolute location comprises transmitting the decompressed latitude and longitude coordinates to another communications device via one of a wired and wireless link.

20. The method of claim 19, wherein the another communications device is one of an emergency control center and another client device.

21. The method of claim 12, wherein it is determined that the difference between the compressed latitude coordinate and the same number and same position of bits in the raw network latitude coordinate of the network device is outside of the maximum wireless range, modifying the remaining most significant bits of the raw network latitude coordinate as a function of the difference comprises:
if subtracting the value of the same number and same position of bits in the raw network latitude coordinate from the value of the compressed latitude coordinate results in a number greater than the maximum wireless range, decrementing the remaining most significant bits of the raw network latitude coordinate prior to concatenation with the compressed latitude coordinate; and
if subtracting the value of the same number and same position of bits in the raw network latitude coordinate from the value of the compressed latitude coordinate results in a number less than the negative of the maximum wireless range, incrementing the remaining most significant bits of the raw network latitude coordinate prior to concatenation with the compressed latitude coordinate.

22. The method of claim 12, wherein it is determined that the difference between the compressed longitude coordinate and the same number and same position of bits in the raw network longitude coordinate of the communications device is outside of the maximum wireless range, modifying the remaining most significant bits of the raw network longitude coordinate as a function of the difference comprises:
if subtracting the value of the same number and same position of bits in the raw network longitude coordinate from the value of the compressed longitude coordinate results in a number greater than the maximum wireless range, decrementing the remaining most significant bits of the raw network longitude coordinate prior to concatenation with the compressed longitude coordinate; and
if subtracting the value of the same number and same position of bits in the raw network longitude coordinate from the value of the compressed longitude coordinate results in a number less than the negative of the maximum wireless range, incrementing the remaining most significant bits of the raw network longitude coordinate prior to concatenation with the compressed longitude coordinate.

* * * * *